US005080918A

United States Patent [19]
Beauvais

[11] Patent Number: 5,080,918
[45] Date of Patent: Jan. 14, 1992

[54] METHOD OF PROCESSING MUSHROOMS USING STARCH, GUM, PROTEIN AND WATER

[75] Inventor: Max Beauvais, Tiburon, Calif.

[73] Assignee: Le Champignon, Inc., San Jose, Calif.

[21] Appl. No.: 489,504

[22] Filed: Mar. 7, 1990

Related U.S. Application Data

[63] Continuation-in-part of Ser. No. 326,606, Mar. 21, 1989.

[51] Int. Cl.$^5$ .......................... A23B 7/06; A23B 7/148
[52] U.S. Cl. ..................................... 426/281; 426/302; 426/573; 426/615
[58] Field of Search ............... 426/281, 573, 614, 615, 426/657

[56] References Cited

U.S. PATENT DOCUMENTS

| | | | |
|---|---|---|---|
| 3,857,979 | 12/1974 | Beauvais et al. | 426/615 |
| 4,143,167 | 3/1979 | Blanchaud et al. | 426/281 |
| 4,328,251 | 5/1982 | Blanchaud et al. | 426/262 |
| 4,557,937 | 12/1985 | Bournier | 426/281 |
| 4,735,813 | 4/1988 | Spinoglio . | |

FOREIGN PATENT DOCUMENTS

| | | | |
|---|---|---|---|
| 72-263 | 7/1981 | European Pat. Off. . | |
| 0072263 | 2/1983 | European Pat. Off. | 426/615 |
| 2489097 | 3/1982 | France | 426/615 |

OTHER PUBLICATIONS

Whistler, R. L., Bemiller, J. N. and Paschall, E. F., 1984, "Starch: Chemistry and Technology", Academic Press, Inc., London, pp. 516–528.

*Primary Examiner*—Donald E. Czaja
*Assistant Examiner*—John Mowbray
*Attorney, Agent, or Firm*—Fliesler, Dubb, Meyer & Lovejoy

[57] ABSTRACT

A salt-free treatment liquid for processing mushrooms comprising waxy rice starch, xanthan gum, pure egg white protein and water. After impregnation of the mushrooms, the mushrooms are blanched in water having a temperature of approximately 90° C. to 100° C. In the blancher the treatment liquid jells within the mushrooms, thereby providing a product which has an improved taste, texture and increased yield.

8 Claims, 4 Drawing Sheets

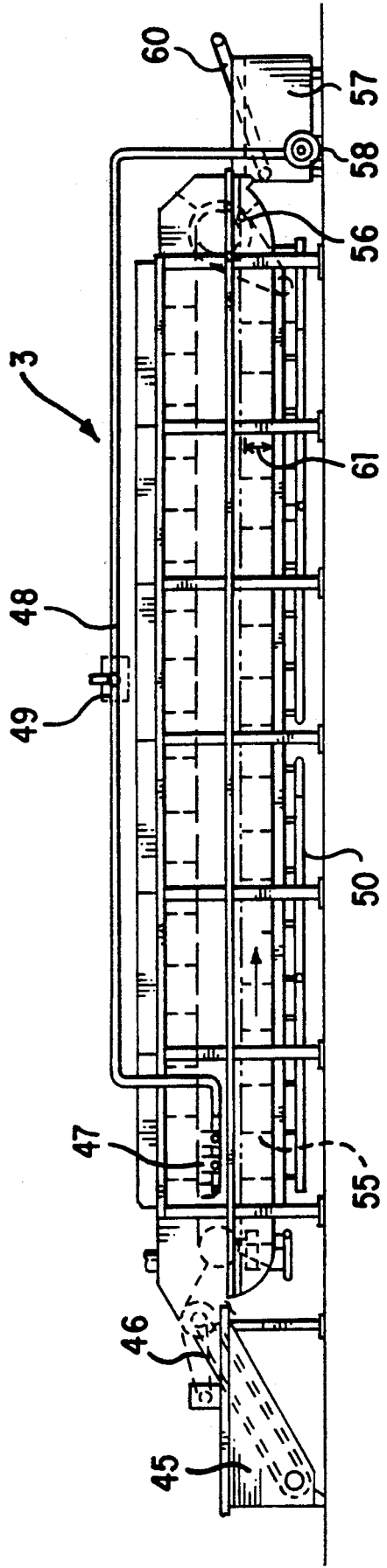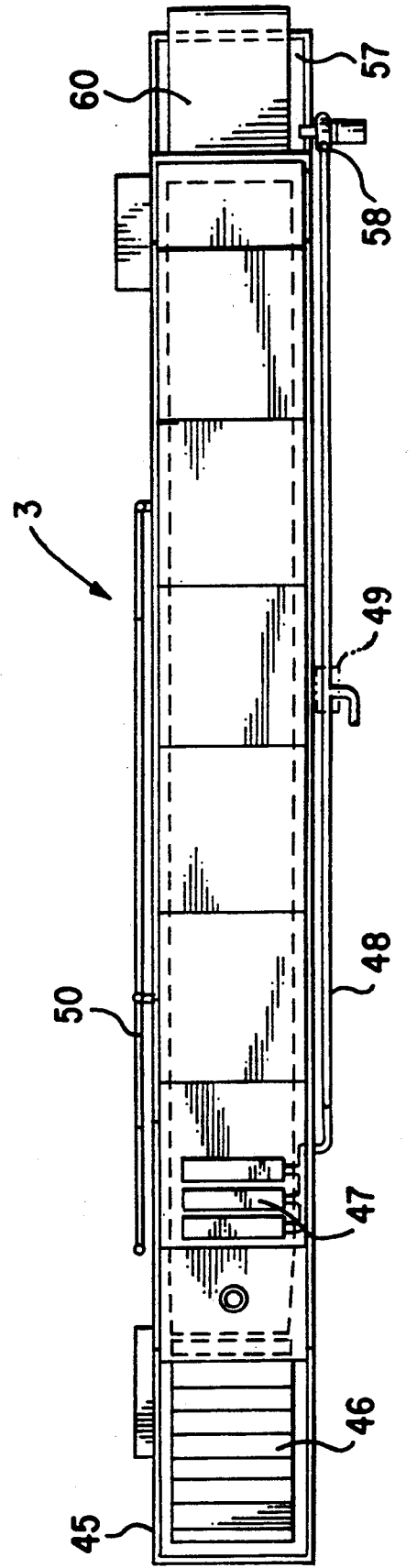

METHOD OF PROCESSING MUSHROOMS USING STARCH, GUM, PROTEIN AND WATER

CROSS-REFERENCE TO RELATED APPLICATION

This is a continuation-in-part of U.S. patent application Ser. No. 07/326,606, filed Mar. 21, 1989, entitled METHOD OF PROCESSING MUSHROOMS USING RICE STARCH, NATURAL GUM, PROTEIN AND WATER.

BACKGROUND OF THE INVENTION

1. Field of the Invention

The present invention relates to processing mushrooms in general and in particular to a novel salt-free treatment liquid for impregnating mushrooms comprising a mixture of starch, gum, protein and water.

2. Description of Prior Art

Various methods have been used in the past to prepare mushrooms for canning. In one such prior known method the mushrooms are washed and peeled and then blanched in boiling water for a period of six to ten minutes. The blanching inactives the mushroom enzymes, coagulates the mushroom protein and expels the air therefrom due to shrinkage.

Disadvantages of this method are that the volume of the mushrooms is reduced, soluble aromas are reduced, mushroom albumin is reduced and the mushrooms undergo a significant weight loss. In addition, it has been found that there is a tendency for the mushrooms to turn grayish-brown during sterilization and blacken when they are exposed to air after the can in which they are stored is opened.

To reduce the above-described loss of weight, color, taste and texture of the mushrooms, various vacuum processes were developed in which the mushrooms are impregnated with treatment liquid comprising water and/or a variety of ingredients.

In one such prior known vacuum process the mushrooms are subjected to a vacuum and impregnated with a treatment liquid comprising a mixture of water or mushroom juice obtained from boiling mushrooms in water and a colloidal substance selected from the group consisting of egg white, casein, milk albumin (lactalbumin) and carrageenan.

In the prior known vacuum process described above, which is disclosed in U.S. Pat. No. 4,328,251, issued to Blanchaud et al, the colloidal substance in the treatment liquid, e.g. egg white, comprised between 10% to 25% by weight relative to the weight of the treatment liquid. The mushroom juice and/or water and the colloidal substance in the treatment liquid are thoroughly homogenized through slow agitation or by ultrasonics. After the mushrooms are placed in a vertical or inclined vacuum chamber, the chamber is evacuated to a pressure on the order of 50 to 60 mm Hg for a relatively long period of time on the order of 6 to 10 minutes to remove air and other gases present in the interstices of the mushrooms. At the end of the vacuum treatment, the treatment liquid is drawn into the vacuum chamber by the vacuum in the chamber to cover the mushrooms with the treatment liquid. After releasing the vacuum, the mushrooms are permitted to remain in the treatment liquid for a period of 5 to 10 minutes. Following the impregnation, the mushrooms are removed from the vacuum chamber, thoroughly washed in running water and blanched in boiling water for 6 to 10 minutes to coagulate the colloidal substance impregnated in the mushrooms.

In two earlier patents disclosing substantially the same vacuum process, U.S. Pat. No. 4,218,484 and U.S. Pat. No. 4,143,167, issued to the patentees of U.S. Pat. No. 4,328,251, the patentees also teach that the vacuum treatment period should be of a relatively long period of time on the order of 1 to 10 minutes, 2 minutes being usually sufficient, and that greater vacuums and longer vacuum treatment periods result in little, if any, improvement in the mushrooms. The patentees also teach that the optimum treatment liquid is characterized by a mixture of approximately equal parts of water and mushroom juice and a colloidal substance comprising 60 grams/liter of finely divided egg white or 280 to 420 grams/liter of liquid egg white. In an example of the results of using the process disclosed in the earlier patents, the patentees disclose that upon completion of the process, the weight of 1000 grams of mushrooms impregnated with the liquid treatment was reduced to 687 grams after the blanching treatment, i.e. a yield of about 69%.

In U.S. Pat. No. 4,735,813, issued to Spinoglio, there are disclosed other vacuum processes using treatment liquids for processing a variety of vegetables comprising mixtures of proteins and starches, such as rice starch, dispersed in 2% salt water. In this process, after a brief thermal treatment, the mushrooms are rapidly cooled to gel the starches in a superficial part of the mushroom so as to form a seal. In still another vacuum process, in which actually appears to be a modification of the foregoing process, there is disclosed the use of ingredients for seasoning and/or enriching in nutritional elements, which may also include thickening agents such as starches and gums. This process, however, also appears to require the formation of a gel in the superficial part by rapid cooling so as to seal the mushroom or other vegetable being processed.

While providing an improvement over the prior known simple blanching process, the treatment liquids used in the above-described vacuum processes are found to have a number of disadvantages. For example, the use of egg white as a colloidal substance in the amounts indicated is very costly. The use of mushroom juice in the treatment liquid requires the additional step of boiling mushrooms to obtain the stock necessary to prepare the treatment liquid. The need for rapidly cooling the mushrooms to form a gel in a superficial part thereof is considered to be time consuming, costly and not particularly effective for maintaining a high yield. Furthermore, the use of salt in a treatment liquid significantly impairs impregnation and adversely affects yields.

The treatment of mushrooms with egg white in the amounts and in the manner disclosed produces a finished, canned product with a packing brine which contains visible amounts of feathery, coagulated albumin, similar in appearance to egg-drop soup. This feathery brine is perceived as undesirable by users of the canned product. The use of egg white alone, in addition to the high cost involved, produces mushrooms having a bland taste. The use of casein derived from dairy products or lactalbumin alone produces bad flavors. The use of water alone or starch and carrageenan (gum) alone produces a poor yield.

SUMMARY OF THE INVENTION

In view of the foregoing, a principal object of the present invention is a novel salt-free treatment liquid for use in high vacuum processing of mushrooms which, in comparison with prior known treatment liquids, provides a yield as good as that which can be achieved using 10% pure egg white protein but at far less cost, i.e. less than one third the cost at current prices, while providing a mushroom having an excellent color, taste and texture.

In accordance with the above object there is provided a salt-free treatment liquid comprising by weight 3% to 7% waxy rice starch, 2% to 5% pure egg white protein, 0.03% to 0.10% xanthan gum and water. Preferably, the amount of starch, egg white, and gum used is 5%, 2.5% and 0.05%, respectively.

The above-indicated preferred formulation of 5% starch, 2.5% egg white and 0.05% gum for the treatment liquid of the present invention produces a yield of around 91%, about the same as produced with 10% egg white, which is much larger than the yield which can be obtained using water alone, starch alone or starch and gum alone.

The following table shows that a simple blanching process for 100 pounds of mushrooms provides a yield of about 60% as follows:

| | | |
|---|---|---|
| Washing | +10% = | 110 lbs. |
| Blanching | −35% = | 71.5 lbs. |
| Slicing | −6% = | 67.21 lbs. |
| Sterilizing | −10% = | 60.48 lbs. |

The above table provides that for each 100 lbs of mushrooms, washing them increases their weight by 10%, i.e. from 100 lbs to 110 lbs. Thereafter, blanching the mushrooms causes them to lose 35% of their weight, reducing their weight from 110 lbs. to 71.5 lbs. Slicing causes an additional 6% loss in weight, i.e. from 71.5 lbs. to 67.21 lbs., and sterilizing then produces still another loss in weight of 10%, from 67.21 lbs. to 60.48 lbs.

Tests show that higher yields can be obtained if the mushrooms are impregnated with a treatment liquid by means of a vacuum. The treatment liquid may comprise, for example, water alone, gum alone, starch and gum and dry egg white alone. The following tables show the yields obtained using such treatment liquids:

| 1. | Water alone: | | |
|---|---|---|---|
| | Washing | +10% = | 110 lbs. |
| | Impregnation | +50% = | 165 lbs. |
| | Blanching | −55% = | 74 lbs. |
| | Slicing | −6% = | 69 lbs. |
| | Sterilizing | −10% = | 62 lbs. |
| 2. | With gum: | | |
| | Washing | +10% = | 110 lbs. |
| | Impregnation | +35% = | 148 lbs. |
| | Blanching | −48% = | 77 lbs. |
| | Slicing | −6% = | 72 lbs. |
| | Sterilizing | −10% = | 65 lbs. |
| 3. | With starch and 0.05% xantham gum: | | |
| | Washing | +10% = | 110 lbs. |
| | Impregnation | +50% = | 168 lbs. |
| | Blanching | −50% = | 82 lbs. |
| | Slicing | −6% = | 77 lbs. |
| | Sterilizing | −10% = | 69 lbs. |
| 4. | 10% dry egg-white alone: | | |
| | Washing | +10% = | 110 lbs. |
| | Impregnation | +40% = | 154 lbs. |
| | Blanching | −30% = | 107 lbs. |
| | Slicing | −6% = | 101 lbs. |
| | Sterilizing | −10% = | 91 lbs. |

A test was also made to determine the yields obtained using 5% waxy rice starch alone and 2.5% egg white alone. The yields obtained were 69.7% and 75%, respectively.

As discussed above, a principal advantage of the present invention is that a significant increase in yield can be obtained using a predetermined amount of egg white and starch in combination at significantly less cost than using egg white alone.

As seen in the following table, a treatment liquid comprising 5% starch, 2.5% dry egg white and 0.05% xantham gum produces the following yields for each 100 pounds of mushrooms:

| | | |
|---|---|---|
| Washing | +10% = | 110 lbs. |
| Impregnation | +40% = | 154 lbs. |
| Blanching | −30% = | 107.8 lbs. |
| Slicing | −6% = | 101.3 lbs. |
| Sterilizing | −10% = | 91.19 lbs. |

The above figures represent the results obtained under industrial conditions. Laboratory results are generally 15% better, i.e. producing an average yield of about 105 lbs. for every 100 lbs. of mushrooms.

As will be noted from the above table, the impregnation of 100 pounds of mushrooms after they have been washed further increases their weight by 44 lbs., i.e. from 110 lbs. to 154 lbs. Using the above increase in weight and the percent of total weight used for each ingredient, the cost of the treatment liquid per 100 lbs. of mushrooms is calculated as follows:

| | | | |
|---|---|---|---|
| Starch | 5% × 44 lbs. = | 2.2 lbs. × 0.65 = | $1.43 |
| Egg white | 2.5% × 44 lbs. = | 1.1 lbs. × 5.75 = | $6.32 |
| Xantham | 0.05% × 44 lbs. = | 0.022 lb. × 7.00 = | $0.15 |
| | | | $7.90 |

In contrast, the cost of the egg white required to produce the same yield, i.e. 91%, for each 100 lbs. of mushrooms is calculated as follows:

$$Egg white 10\% \times 44\ lbs. = 4.4 lbs \times 5.75 = \$25.00$$

One of the principal reasons discovered for the low yields obtained with prior known treatment liquids has to do with the fact that during blanching the mushroom protein coagulates, causing the mushroom to shrink at a temperature which is generally 6–8° C. lower than the temperature of coagulation of gelling of typically used impregnating substances. For example, the start of the coagulation of mushroom protein generally occurs at a temperature of about 60° C., whereas the temperature of gelling of starch begins around 68° C. Because of the delayed gelling of the starch, there is a tendency for the mushroom shrinkage to expel much of the starch impregnating liquid before the starch gels.

In investigating the superior results obtained using the treatment liquid of the present invention, it was found that the temperature of coagulation of the pure egg white therein was approximately the same as the temperature of coagulation of the mushroom protein. Thus, it was found that the coagulation of the egg white, even in the relatively small amount used, produces a coagulum early in the blanching process which has the beneficial effect of preventing the expulsion of the starch from the mushroom before it gels.

A further benefit of the relatively small amount of egg white which is used in the treatment liquid of the present invention is that no residue thereof appears in the brine of the mushrooms canned therewith.

Following the preparation of the treatment liquid using chilled water, the mushrooms are placed in a vacuum chamber and subjected to a high vacuum on the order of less than 10 mm Hg for a period of time, e.g. 30–60 seconds, sufficient to remove from 98% to 99% of the air and gases from the interstices in the mushrooms. At the end of the vacuum treatment and while maintaining the pressure within the vacuum chamber at a pressure of less than 10 mm Hg, the treatment liquid is introduced into the chamber in an amount sufficient to submerge the mushrooms. Once the mushrooms are fully submerged in the treatment liquid, the pressure in the vacuum chamber is raised to a higher pressure, e.g. atmospheric pressure or greater. Thereafter, the mushrooms are allowed to remain in the treatment liquid for a period of time, approximately 10–60 seconds, until they are fully saturated with the treatment liquid. Following impregnation, the treatment liquid is drained from the chamber, the mushrooms are removed from the chamber and blanched.

In blanching the mushrooms, the mushrooms are submerged in and gently moved through a trough of boiling water for a period of time, e.g. 6 to 15 minutes, sufficient to create a gel of the treatment liquid contained within the mushrooms.

After blanching, if the cooked mushrooms are to be sliced or diced, they are cooled via water sprays and/or immersion to approximately 30° C. to 40° C. and then mechanically sliced or diced. For whole mushroom packs, the cool-down steps and slicing and dicing steps are eliminated.

BRIEF DESCRIPTION OF THE DRAWINGS

The above and other objects, features and advantages of the present invention will become apparent from the following detailed description of the accompanying drawings in which:

FIG. 5 is a side view of a blancher according to the present invention; and

FIG. 6 is a top plan view of the blancher of FIG. 5.

DETAILED DESCRIPTION OF THE PREFERRED EMBODIMENT

Figure 1:
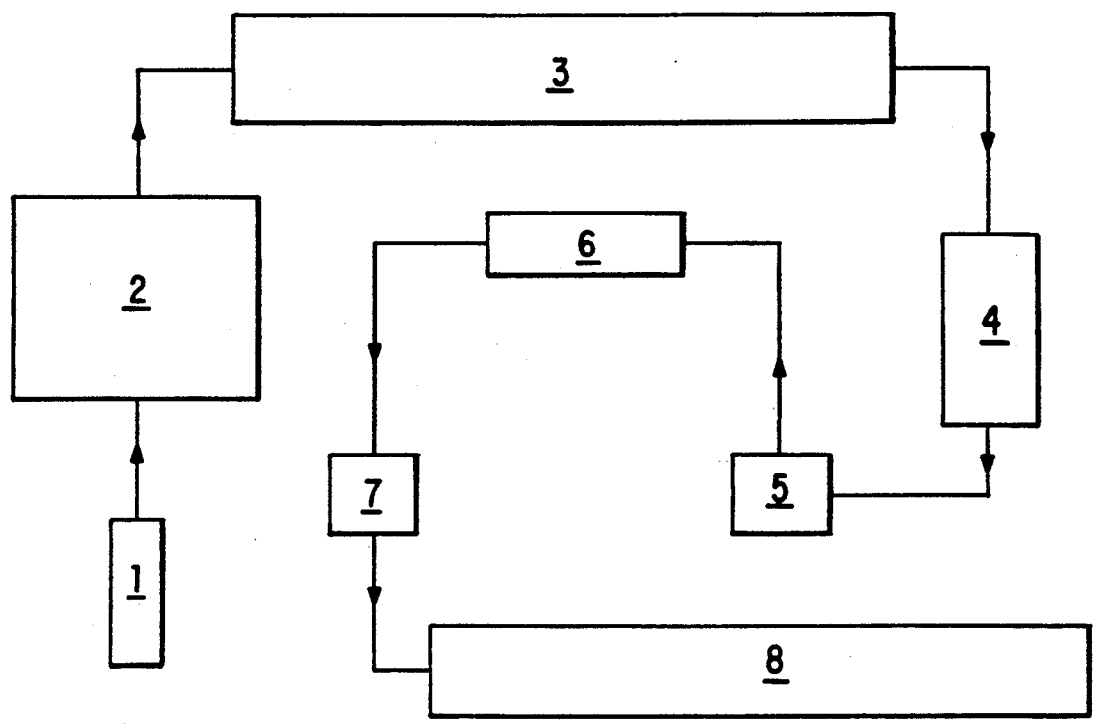
FIG. 1 is a general schematic of major line components for processing and canning mushrooms using a treatment liquid according to the present invention.

Referring to FIG. 1, there is shown a continuous vacuum mushroom processing line comprising in sequence a washing and sorting apparatus 1 for washing and sorting the mushrooms, a vacuum impregnation apparatus 2 for impregnating the mushrooms with a treatment liquid in accordance with the present invention as will be described in more detail below, a blanching apparatus 3 for creating a gel of the treatment liquid in the mushrooms after impregnation, a cooling and slicing apparatus 4 for cooling and slicing the mushrooms after blanching, a filling, brining and check weighing apparatus 5 for packing the mushrooms in cans, an exhausting (preheating) apparatus 6 for expelling air from the cans, a can closing machine 7 and a retort apparatus 8 for sterilizing the finished product.

Figure 2:
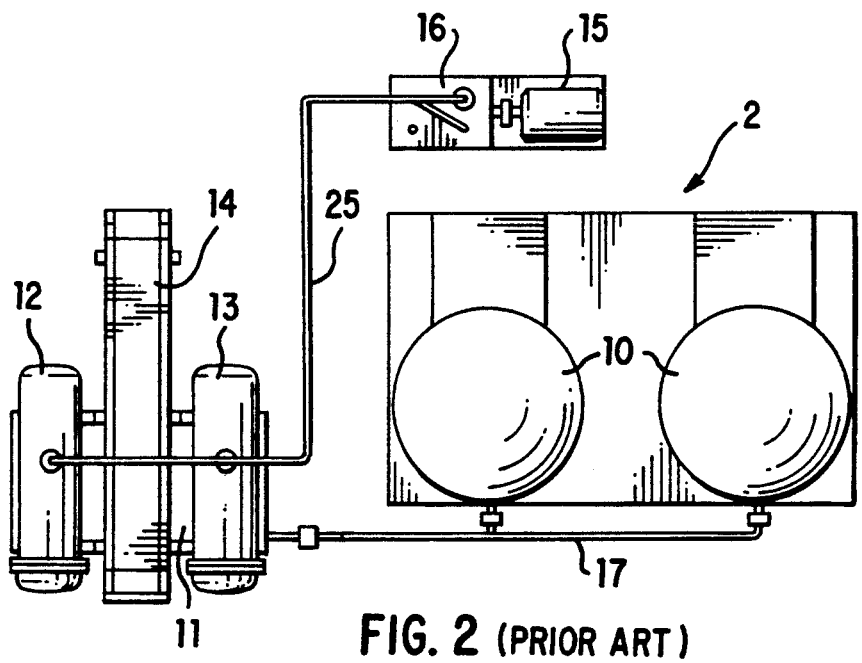
FIG. 2 is a top plan view of conventional vacuum impregnation and treatment liquid holding apparatus for impregnating mushrooms with a treatment liquid according to the present invention.
Figure 3:
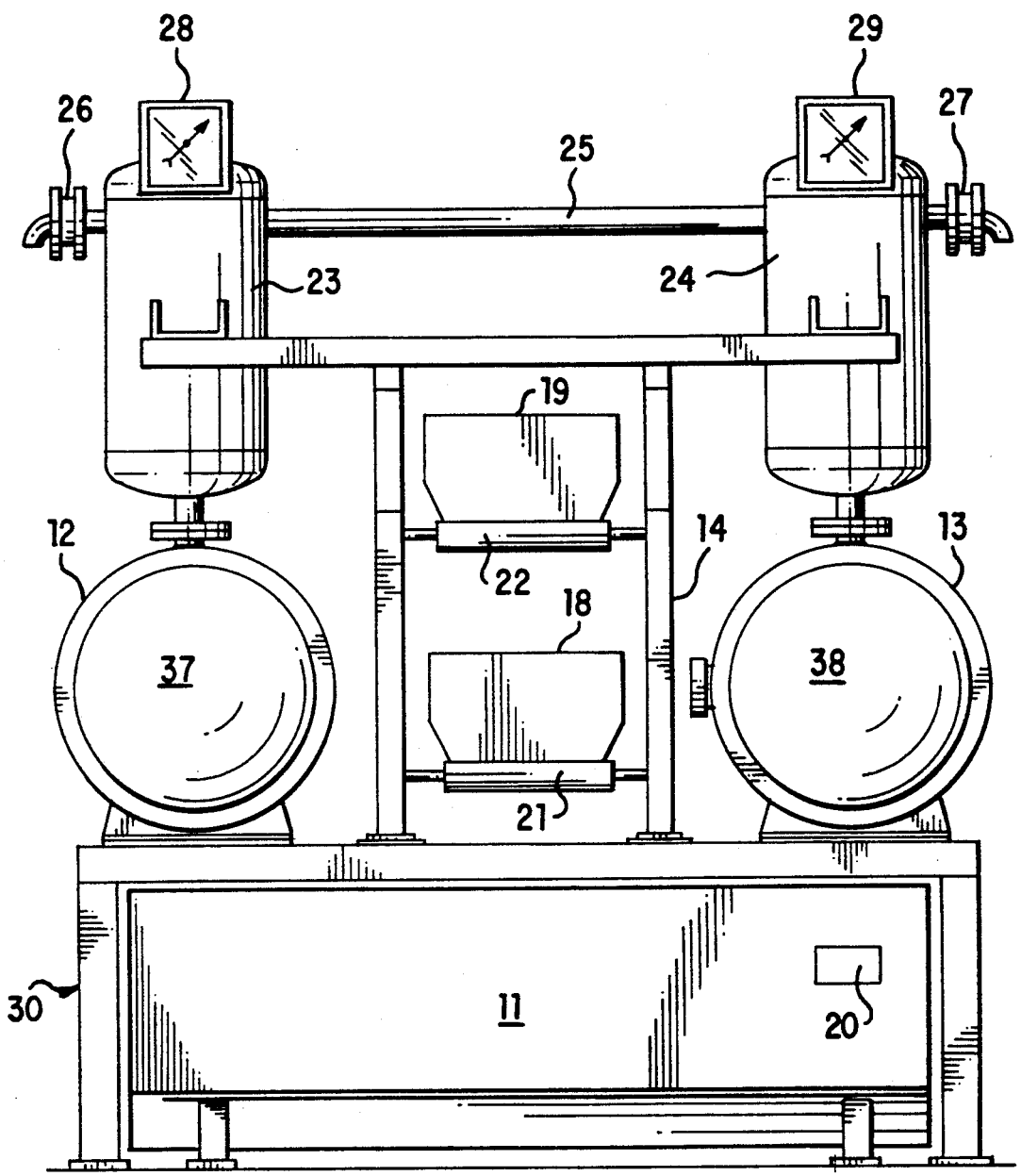
FIG. 3 is an end view of the vacuum impregnation apparatus of FIG. 2.
Figure 4:
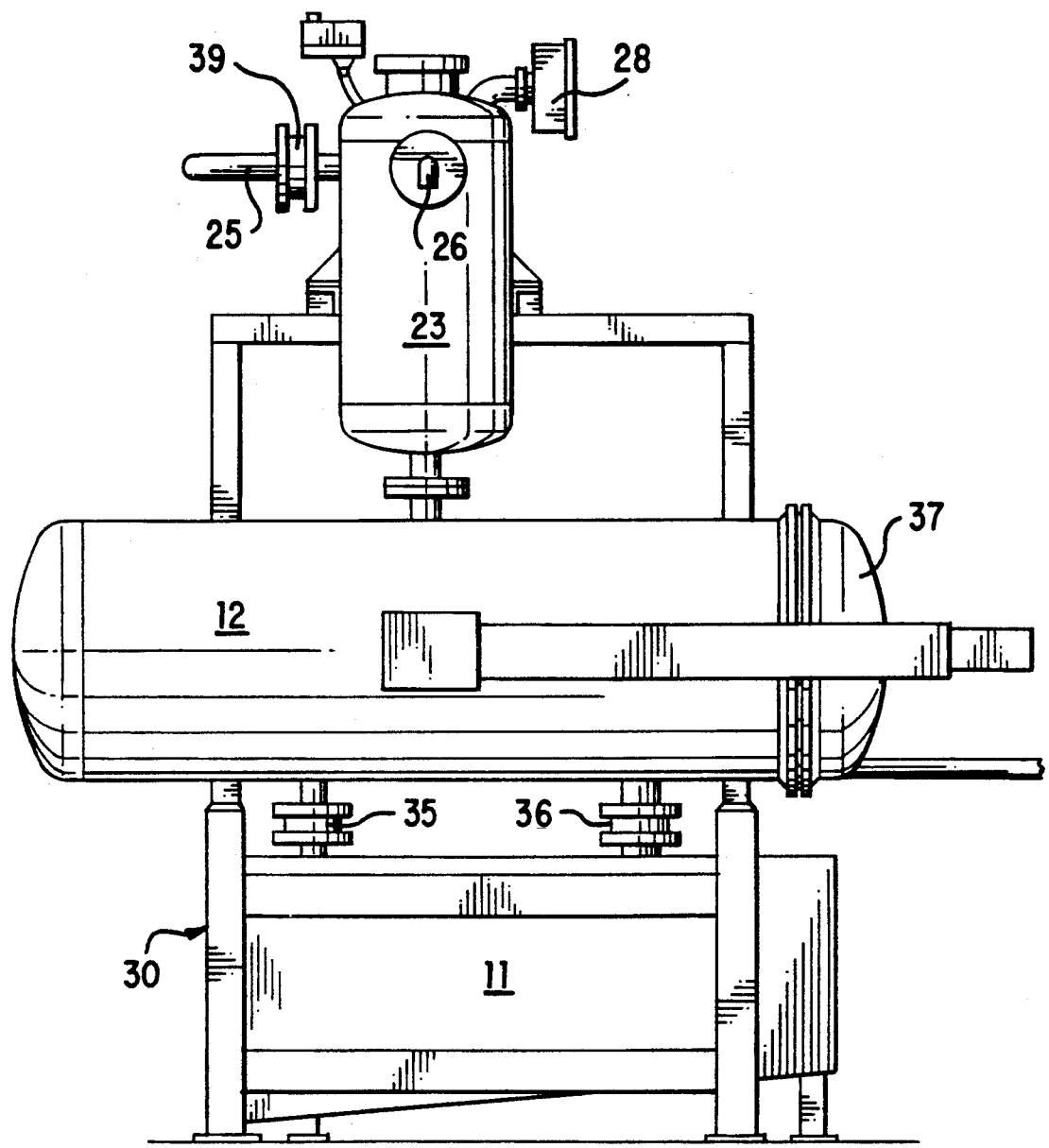
FIG. 4 is a side view of the vacuum impregnation apparatus of FIG. 3.

Referring to FIGS. 2–4, in which the same numeral will be used for designating the same feature, there is provided in the vacuum impregnation apparatus 2 a plurality of refrigerated holding tanks 10 for holding a treatment liquid to be described below, an insulated surge tank 11 for holding the treatment liquid, a pipe 17 for transporting the treatment liquid from the holding tanks 10 to the surge tank 11, a plurality of horizontal cylindrical vacuum chambers 12 and 13, basket conveyors designated generally as 14 for conveying baskets of washed mushrooms as well as empty baskets, a vacuum pump and venturi booster apparatus 15, and a vacuum pump drive motor 16.

Referring to FIG. 3, there is further provided in the insulated surge tank 11 an inlet 20 coupled to the pipe 17 for receiving the refrigerated treatment liquid from the refrigerated holding tanks 10. In the basket conveyor 14 there is provided a lower roller conveyor 21 for conveying full baskets 18 of washed mushrooms and an upper roller conveyor 22 for conveying empty baskets 19. Attached to each of the horizontal vacuum chambers 12 and 13 there is provided a liquid level and vacuum surge tank 23 and 24, respectively. Interconnecting the surge tanks 23 and 24 to the vacuum pump drive motor 16 there is provided a vacuum supply line 25. Extending from the surge tanks 23 and 24 there is provided a vacuum release vent valve 26 and 27, respectively, and a vacuum gauge 28 and 29, respectively. The horizontal vacuum cylinders 12 and 13, roller conveyors 21 and 22 and surge tanks 23 and 24 are supported over the surge tank 11 by means of a frame designated generally as 30.

Referring to FIG. 4, there is further provided for interconnecting the vacuum chambers 12 and 13 and the surge tank 11 a plurality of filling valves 35 (only one of which is shown) for transporting the treatment liquid from the surge tank 11 into the vacuum chambers 12 and 13 and a plurality of drain valves 36 (only one of which is shown) for draining treatment liquid from the vacuum chambers 12 and 13 into the surge tank 11. At the front end of each of the vacuum chambers 12 and 13 there is provided a vacuum chamber door 37 and 38, respectively. Located in the vacuum supply line 25 there is provided a plurality of vacuum valves 39 (only one of which is shown) for coupling and decoupling the vacuum chambers 12 and 13 and liquid and vacuum surge tanks 23 and 24 to and from the vacuum pump 15. A plurality of valves is used so that each chamber can be used separately.

Referring to FIGS. 5 and 6, there is provided in the blanching apparatus 3, a water-filled feed tank 45, a metering feed elevator 46 and hot water deluge pans 47. The pans 47 are connected to a source of hot water by means of a hot water recirculation pipeline 48. Included in the pipeline 48 there is provided a hot water recirculation system steam injection chamber 49 for injecting steam into the hot water recirculation system. For heating the blancher water along the length of the blancher there is provided a steam injection manifold 50 for injecting steam into the blancher water at various points along the bottom of the blancher. In the interior of the blancher there is provided a plurality of divider baffles 55 which are coupled to carrier chains (not shown) for moving mushrooms through the blancher. A drive system 56 is provided at one end of the blancher for driving the divider baffles and carrier chain assembly 55. Located adjacent to the drive system 56 there is provided a hot water discharge and surge tank 57. A recirculation pump 58 is coupled to the tank 57 and the hot water recirculation system pipeline 48 for transferring hot water to the deluge pans 47. Located above the discharge and surge tank 57 there is provided a discharge elevator 60.

As will be further described below, in normal operation the blancher water level is sufficient to cover the mushrooms moved therethrough, as shown by the arrow 61 in FIG. 5.

As indicated above, the processing of mushrooms according to the present invention using the apparatus shown in FIGS. 1-6 involves the preparation of a treatment liquid. The treatment liquid is prepared using mixing equipment to blend in a blending tank waxy rice starch having a particle size of from 2 to 8 microns, pure protein, such as egg white, natural gum, preferably xanthan, and water chilled to a temperature of less than 6° C. Pure protein means isolates which contain a minimum of 85% protein. The mixing equipment and blend tank (not shown) are of a design which imparts high shear and turbulence to the liquid mixture while minimizing air entrainment, such as "Lightnin" mixers with high shear impellers.

The percentage weights of the above-listed ingredients to the total batch weight of the treatment liquid are as follows:

| (a) waxy rice starch | 3% to 7% |
| (b) pure protein | 2% to 5% |
| (c) natural gum | 0.03% to 0.10% |
| (d) chilled water | 88% to 95% |

The timing and order of addition of the above-listed ingredients is important to the functional properties of the treatment liquid. After adding a measured amount of chilled water to the blending tank, the waxy rice starch is added and mixed for about 10 minutes to avoid clustering of the starch. The gum, which is pre-blended with 2 times its weight of rice starch to aid dispersion, is then added slowly to the mixture of the rice starch and water. The pure protein is then added and the mixing is continued for about another 5 to 10 minutes until the treatment liquid is smooth.

After the treatment liquid is formulated as described above, the liquid is transferred to refrigerated holding tanks 10 and held at 2° C. to 6° C.

Referring again to FIG. 1, in practicing the process of the present invention, fresh refrigerated mushrooms are washed, inspected and sorted to remove defects, foreign material and off-sized units in the washer and sorting apparatus 1. Preferably, the mushrooms are refrigerated to a temperature of from 2° C. to 6° C. The washed and sorted mushrooms are then transferred into the baskets 18 and transported to the horizontal cylindrical vacuum chambers 12 and 13 for vacuum impregnation by the treatment liquid prepared as described above.

In the impregnation cycle, the vacuum chambers 12 and 13 are loaded with the washed mushrooms, sealed and evacuated by means of the vacuum pump 15 via the surge tanks 23 and 24 to a pressure of less than 10 mm Hg for a period of time, approximately 30 to 60 seconds, sufficient to remove 98-99% of the entrained air and gases in the mushrooms. After the evacuation cycle, and while maintaining the pressure in the vacuum chamber at less than 10 mm Hg by leaving the vacuum valve open to the appropriate surge tank 23 or 24, respectively, the valve 35 is opened which allows the introduction of the chilled treatment liquid into the vacuum chambers in an amount sufficient to fully flood the horizontal chambers and a portion of the surge tanks 23 and 24. The liquid is restricted to the lower portion of the surge tanks 23 and 24 so as not to be drawn into the vacuum piping and pump 15. The amount of time for the introduction of the treatment liquid into the vacuum chamber is approximately 25-30 seconds, depending on the size of the fill pipe and interior volume of the horizontal chambers. Once the mushrooms are fully submerged in the treatment liquid, the pressure in the vacuum chamber is raised to a higher pressure, typically atmospheric pressure or greater. The mushrooms are then allowed to remain in the treatment liquid for approximately 10 to 60 seconds to enable complete saturation of the mushrooms at the higher pressure. The treatment liquid is then drained from the vacuum chamber by means of the valve 36. This takes approximately 30 seconds. The vacuum chamber is then opened and the impregnated mushrooms are removed. It should be noted that in order to keep the treatment liquid from boiling in the vacuum chamber, the temperature of the treatment liquid being introduced into the vacuum chamber should be kept below 6° C.

After the mushrooms are removed from the vacuum chambers 12 and 13, they are transferred into the blancher 3 by way of the water-filled feed tank 45. In the blancher 3, the saturated mushrooms are gently submerged in boiling water by means of the elevator 46. The deluge pans 47 are provided to deluge the mushrooms with boiling water to very quickly heat the chilled mushrooms in order to prevent loss of the treatment liquid by creating a gel of the treatment liquid contained within the mushrooms. The blancher 3 is able to heat the mushrooms very quickly while the divider baffles 55 move them gently and with positive flow control through the blancher. The temperature of the blancher water is preferably 90° C. to 100° C. The mushrooms remain in the blancher 3 for approximately 6-15 minutes depending on their size. Thereafter, the mushrooms are gently discharged from the blancher 3 by means of the elevator 60.

Following blanching, the mushrooms are further processed depending upon whether they are going to be used in a sliced pack, used in a whole mushroom pack, canned or frozen. For the sliced pack, the cooled mushrooms are cooled via water sprays and/or immersion in the cooling apparatus 4 to approximately 30° C. to 40° C. and then mechanically sliced. For whole mushroom packs, the cool-down and slicing steps are eliminated. For the canning process, the mushrooms are deposited into cans, check-weighed and topped with a suitable salted and acidified brine in the filling, brining and check weighing apparatus 5. By an alternative method, dry salt and acidulant are first added to the empty cans, followed by the mushrooms and hot water topping of the cans. From the apparatus 5 the canned mushrooms are transported through the exhausting apparatus 6 for preheating, and double-seam sealed in the closing machine 7. The sealed cans are then sterilized in conventional steam retorts 8 and cooled. For freezing, the cooked mushrooms are cooled, sliced or diced and then frozen in conventional individually quick-frozen apparatus and packaged.

While a preferred embodiment of the present invention is disclosed herein, it is contemplated that various modifications may be made in the steps of the process and the apparatus used without departing from the spirit and scope of the present invention. For example, while 5% by weight of waxy rice starch having a particle size of from 2 to 8 microns is known to be suitable, it is possible that other starches having an equivalent range of particle sizes may also be effective. Similarly, while 2.5% by weight of egg white is known to be suitable for use with the starch, it is possible that other proteins may also be suitable so long as they have a coagulation temperature substantially equal to or lower than the coagulation temperature of the mushroom protein. Accordingly, the scope of the present invention should not be strictly limited to the steps and apparatus disclosed but be determined by reference to the claims hereinafter provided.

What is claimed is:

1. A salt-free treatment liquid for impregnating mushrooms comprising:
    a predetermined amount which falls between 3% and 7% by weight of the treatment liquid of waxy rice starch having a particle size of from 2 to 8 microns; and
    a predetermined amount which does not exceed about 5% by weight of the treatment liquid of protein having a temperature of coagulation which is substantially equal to or lower than the temperature of coagulation of the natural mushroom protein in said mushrooms, the amount of protein being sufficient so that on the mushroom being heated to the temperature of coagulation of the natural mushroom protein in the mushrooms the protein coagulates thereby preventing expulsion of the starch from the mushrooms for a time sufficient for the starch to gel within the mushrooms.

2. A salt-free treatment liquid for impregnating mushrooms according to claim 1 wherein said protein comprises egg white.

3. A salt-free treatment liquid for impregnating mushrooms according to claim 2 wherein said predetermined amount of said waxy rice starch comprises from 3% to 7% by weight of said treatment liquid, said predetermined amount of said egg white comprises 2% to 5% by weight of said treatment liquid.

4. A salt-free treatment liquid for impregnating mushrooms according to claim 2 wherein said predetermined amount of said waxy rice starch comprises 5% by weight of said treatment liquid and said predetermined amount of said egg white comprises 2.5% by weight of said treatment liquid.

5. A salt-free treatment liquid for impregnating mushrooms according to claim 1 further comprising a predetermined amount of gum for holding said waxy rice starch in suspension in said treatment liquid.

6. A salt-free treatment liquid for impregnating mushrooms according to claim 5 wherein said gum comprises xanthan gum and said predetermined amount of xanthan gum comprises from 0.03% to 0.10% by weight of the treatment liquid.

7. A method of processing mushrooms comprising the steps of:
    preparing a mixture of natural gum, waxy rice starch and chilled water by mixing a selected amount of natural gum and a selected amount of waxy rice starch in a measured amount of chilled water for approximately 10 minutes, said chilled water having been chilled to a temperature of from 1° C. to 5° C.;
    preparing a salt-free treatment liquid comprising a mixture of natural gum, waxy rice starch, chilled water and pure egg white protein by mixing in equipment which imparts high shear and turbulence to the treatment liquid a selected amount of pure egg white protein in said mixture of natural gum, waxy rice starch and chilled water for approximately 10 minutes until said treatment liquid is smooth, the percentage weight of the ingredients of said treatment liquid to the total batch weight being as follows:

| | |
|---|---|
| (a) waxy rice starch | 3% to 7% |
| (b) pure egg white protein | 2% to 5% |
| (c) natural gum | 0.03% to 0.10% |
| (d) chilled water | 88% to 95%; | maintaining the temperature of the treatment liquid within a range from about 2° C. to about 6° C.;
cooling a batch of mushrooms to a temperature which falls in a range from about 2° C. to about 6° C.;
subjecting the mushrooms to a vacuum at a pressure of less than about 10 mm Hg for a period of time sufficient to remove about 98% or more of the entrained air and gases from the mushrooms;
contacting the treatment liquid with the mushrooms in an amount sufficient to fully cover the mushrooms while maintaining the pressure at less than about 10 mm Hg;
raising the pressure to or above atmospheric pressure;
allowing the mushrooms to remain in the treatment liquid for a time sufficient to enable complete saturation of the mushrooms at the higher pressure;
separating the treatment liquid from the mushrooms; and
blanching the mushrooms with blancher water at a temperature of between about 90° C. and 100° C.

8. A method as set forth in claim 7, further including: sterilizing the blanched mushrooms.

* * * * *